United States Patent [19]
Kumar

[11] Patent Number: 5,862,186
[45] Date of Patent: Jan. 19, 1999

[54] RF SIMPLEX SPREAD SPECTRUM RECEIVER AND METHOD

[76] Inventor: Derek D. Kumar, 2313 Blackthorn Dr., Champaign, Ill. 61821

[21] Appl. No.: 566,073

[22] Filed: Dec. 1, 1995

[51] Int. Cl.$^6$ ................................................... H04L 27/06
[52] U.S. Cl. .......................... 375/324; 375/208; 375/340
[58] Field of Search .................................. 375/200, 208, 375/324, 325, 326, 340, 341, 346, 367; 370/203, 206, 208

[56] References Cited

U.S. PATENT DOCUMENTS

| | | | |
|---|---|---|---|
| 5,191,576 | 3/1993 | Pommier et al. | 370/312 |
| 5,228,025 | 7/1993 | Le Floch et al. | 370/206 |
| 5,274,629 | 12/1993 | Helard et al. | 370/208 |
| 5,452,322 | 9/1995 | Lauer | 375/330 |
| 5,469,452 | 11/1995 | Zehavi | 371/43 |
| 5,524,027 | 6/1996 | Huisken | 375/341 |
| 5,546,420 | 8/1996 | Seshadai et al. | 375/200 |
| 5,592,471 | 1/1997 | Briskman | 375/200 X |
| 5,615,227 | 3/1997 | Schumacher, Jr. et al. | 375/206 |

FOREIGN PATENT DOCUMENTS 9602101 1/1996 WIPO .

OTHER PUBLICATIONS

"A New Multilevel Coding Method Using Error Correcting Codes," IEEE Transactions on Information Theory, vol. 23, No. 3, pp. 371–377, May, 1977.

"Multilevel Codes Based on Partitioning", IEEE Transactions on Information Theory, vol. 35, No. 1, pp. 87–98; Jan. 1989 By G. J. Pottie and D. P. Taylor.

"Multistage Coding and Decoding for a M–PSK System," IEEE Globecom '90 Dec. 2–5, 1990, San Diego, CA, pp. 698–703, By T. Woerz and J. Hagenauer.

"Multilevel Trellis Coded Modulations for the Rayleigh Fading Channel", IEEE Transactions on Communications, vol. 41, No. 9, pp. 1300–1310, Sep., 1993, By N. Seshadri and C.E.W. Sundberg.

"Performance Analysis of a Multilevel Coded Modulation System," IEEE Transactions on Communications, vol. 42, No. 2/3/4, pp. 299–312, Feb./Mar./ Apr. 1994, By Y. Kofman, E. Zehavi, adn S. Shamai.

"Highly Reliable Multilevel Channel Coding System using Binary Convolution Codes", Electronic Letters, vol. 23, No. 18, pp. 939–941, Aug. 1987, By K. Yamaguchi and H. Imai.

*Primary Examiner*—Young T. Tse
*Attorney, Agent, or Firm*—Joseph A. Rhoa

[57] ABSTRACT

A method and system are provided for the reception of a biorthogonally-modulated RF signal in a simplex free-space system. The method is found to substantially diminish the coupling between the error probabilities of those bits associated with signal selection and those bits associated with signal polarity in prior art biorthogonal receivers. By decoupling the error probabilities, the polarity information error rate is reduced and consequently the overall error rate of the receiver system is improved. The receiver system preserves soft-decision reliability information for the signal selection bits in a manner so that the information is insensitive to uncompensated amplitude fluctuations in the received signal. The method and system are applicable to all known biorthogonal signal sets but requires a specific interleaving structure in the corresponding transmitter system.

5 Claims, 8 Drawing Sheets

RF SIMPLEX SPREAD SPECTRUM RECEIVER AND METHOD

This invention relates to a method and system for improving the bit error rate performance of a receiver in a spread spectrum radio frequency (RF) communication system with orthogonal digital signals and biorthogonal modulation in the presence of RF channel impairments, for example, additive white Gaussian noise. More particularly, this invention relates to the reception of a biorthogonally modulated spread spectrum digital signal by means of a multiple-step demodulator and error correction code (ECC) decoder which reduces the probability of error for some fraction of the received bits.

RELATED APPLICATIONS

This application is related to commonly owned co-pending U.S. Ser. No. 08/554,364, filed Nov. 6, 1995, entitled "SYSTEM AND METHOD FOR MULTIPLEXING A SPREAD SPECTRUM COMMUNICATION SYSTEM".

CLAIM TO COPYRIGHT IN REFERENCE TO MICROFICHE APPENDIX

A portion of the disclosure of this patent application contains material which is subject to copyright protection. The copyright owner has no objection to the reproduction by anyone of the patent document as it appears in the Patent and Trademark Office files or records, but otherwise reserves all copyrights whatsoever. Software for carrying out some of the methods and systems described herein has been filed with the United States Patent and Trademark Office herewith in the form of a microfiche appendix including numerous frames, one of which being a title frame. The microfiche appendix is entitled RF SIMPLEX SPREAD SPECTRUM RECEIVER AND METHOD and includes one (1) microfiche and seventy-two (72) frames.

BACKGROUND OF THE INVENTION

Robust mobile digital communication is difficult to accomplish because of the deleterious effects of the environment on the propagation characteristics of the radio-frequency (RF) channel (from about 0 to 100 Gigahertz). Atmospheric conditions and variations in terrain, foliage, and the distribution and density of man-made structures and operating machinery strongly affect the characteristics of the medium which RF signals traverse. Satellite communication systems are typically limited by insufficient electromagnetic radio-frequency (RF) field strength due to the presence of background cosmic, atmospheric, and man-made noise which together establish an irreducible noise floor. Satellite systems may also be limited by the thermal noise of the active electronic components used in the implementation of the receiver system. Terrestrial mobile communications systems are also subject to performance degradation due to the effects of background and thermal noise. However, terrestrial mobile receiver systems are further degraded by multipath propagation due to the reception of signals corresponding to paths other than the line-of-sight (LOS) propagation path.

A method which is used to combat the deleterious effects of multipath propagation, as well as interference from other sources, is "spread spectrum" modulation [reference: R. L. Pickholtz, D. L. Schilling, and L. B. Milstein, "Theory of spread-spectrum communications—a tutorial, *IEEE Transactions on Communications*, Vol. 30, No. 5, pp. 855–884, May 1982]. See also U.S. Pat. Nos. 5,063,560; 5,081,543; 5,235,614; and 5,081,645. In a spread spectrum communication system, the bandwidth occupied by the digital data message is expanded (spread) in the transmitter by multiplying the data message by a spreading signal or sequence which is unrelated to the data message. The spreading effect is collapsed in the receiver by the process of correlation. Multipath and other forms of interference which are frequency-selective then only perturb part of the spread signal. However, spread spectrum methods are no more effective than narrowband modulation methods, for example, the method of Orthogonal Frequency Division Multiplexing (OFDM) [reference: W. Y. Zou and Y. Wu, "COFM: an overview," *IEEE Transactions on Broadcasting*, Vol. 41, No. 1, pp. 1–8, March 1995], in combating the effects of wideband noise.

A disadvantage of spread spectrum modulation is that it typically has relatively poor spectrum efficiency (i.e. less than one bit per Hertz per information symbol). The ability of the spread signal to combat narrowband forms of interference is determined by the "processing gain" of the spread spectrum system, which is essentially the ratio of the spread signal bandwidth to that of the original data message. Therefore, in order to ensure sufficient processing gain, the data message bandwidth is a small fraction of the spread signal bandwidth (e.g. less than about one-tenth). As a result, it may be difficult to use single-carrier spread spectrum modulation in circumstances where the available bandwidth is strictly limited and the necessary data throughput requires high spectrum efficiency.

A spread spectrum communication system requires the use of at least one transmitted spreading signal. It is possible to increase the throughput of a spread spectrum communication system through the consideration of additional spreading signals in the determination of the transmitted signal. Two prior art methods for increasing the information efficiency of a spread spectrum communication system are "m-ary orthogonal" modulation and "m-ary biorthogonal" modulation [reference: W. C. Lindsey and M. K. Simon, *Telecommunication Systems Engineering*. Englewood Cliffs, N.J.: Prentice-Hall, Inc., 1973, p. 198, pp. 210–225]. Both of these methods differ from methods of simultaneously multiplexing spreading signals, in which a plurality of spread signals are simultaneously transmitted in a single information symbol or baud. In m-ary orthogonal modulation, only one signal selected from a plurality of spreading signals is transmitted for the duration of the baud. If there are a number, denoted M, of signals in the signal set, then with m-ary orthogonal modulation, each information baud conveys $\log_2 M$ information bits because the determination as to which one of the M signals (i.e. a 1-of-M choice) can be represented with $\log_2 M$ decision bits, hereafter known as the "selection" bits.

Prior art m-ary biorthogonal modulation is similar to m-ary orthogonal modulation except that the polarity of the transmitted signal is also modulated by some bits in the data message. While the m-ary orthogonal system conveys $\log_2 M$ information bits in a baud through the selection of the transmitted signal, the m-ary biorthogonal system conveys $(\log_2 M)+1$ information bits through the selection of the transmitted signal ($\log_2 M$ bits as before) and determination of the transmitted signal polarity by one bit per information symbol, hereafter known as the "polarity bit". The specific prior art embodiment of biorthogonal modulation where M is one (1) corresponds to zero (0) selection bits and only one polarity bit. This is equivalent to prior art "antipodal" (also known as bipolar, biphase, BPSK) modulation where the signal is always transmitted and only the polarity of said signal is modulated. The embodiment with M equal to one (1) of biorthogonal modulation is a degenerate example and is not considered further. In the instant application, the minimum valid number M of signals for m-ary orthogonal or m-ary biorthogonal modulation is two (2). Furthermore, only binary powers of two are considered for values of M (i.e. two, four, eight, sixteen, and so forth). The methods of m-ary orthogonal and m-ary biorthogonal modulation are unrelated to the modulation method of "m-ary amplitude" modulation, where one of a plurality of amplitude scale factors are applied to a spread signal in order to increase the information density.

In order to implement a receiver for transmitted m-ary orthogonal or biorthogonal signals, the signals in the signal set are identically embodied in both the transmitter and the receiver system and are pairwise distinct for all M signals. Furthermore, the signals must all be pairwise orthogonal or approximately orthogonal (AO). Mutually orthogonal or orthogonal signals are defined as having a crosscorrelation value (sum) of about zero, when properly synchronized. The crosscorrelation value of two signals is proportional to the sum or equivalently the integration of the pairwise product of the two signals (i.e. the inner product). AO signals are distinguished from orthogonal signals by having the characteristic of a small-magnitude crosscorrelation value, which is non-zero. Either orthogonal or AO signals may be used with either m-ary orthogonal or m-ary biorthogonal modulation. As the value of M is increased, the maximum permitted crosscorrelation value among signal pairs for proper operation of the receiver system is decreased. Whereas perfectly orthogonal signals do not interfere with one another in a correlation receiver, when AO signals are implemented, error correcting codes are typically required in order to reduce the irreducible error level (known as the code noise or self-noise) due to mutual crosscorrelation interference between the non-orthogonal AO signals.

Spreading signals can be determined by various methods. Some spreading signals or sequences which have been implemented in prior art spread spectrum systems include, but are not limited to, distinct m-sequences, which are also known as pseudonoise (PN) sequences or maximal-length sequences [reference: D. V. Sarwate and M. B. Pursley, "Crosscorrelation properties of pseudorandom sequences," *Proceedings of the IEEE*, Vol. 68, No. 5, pp. 593–619, May 1980], distinct phases of a single m-sequence [reference: S. L. Miller, "An efficient channel coding scheme for direct sequence CDMA systems," *Proceedings of MILCOM '91*, pp. 1249–1253, 1991], orthogonal m-sequences with bit stuffing as disclosed by Gutleber in U.S. Pat. No. 4,460,992, issued Jul. 17, 1984, Gold codes, Kasami codes, Hadamard codes, and Bent codes [reference: S. Tachikawa, "Recent spreading codes for spread spectrum communications systems," (translated) *Electronics and Communications* in Japan, Part 1, Vol. 75, No. 6, pp. 41–49, June 1992]. It is also possible to determine spreading sequences which occupy the available bandwidth and which are orthogonal using matrix eigenvector methods, such as disclosed in U.S. Pat. No. 4,403,331 by P. H. Halpern and P. E. Mallory, or by using orthogonal wavelets as disclosed by Resnikoff, et al. in U.S. Pat. No. 5,081,645. Some of the previously disclosed methods use orthogonal or approximately orthogonal spread spectrum signals together with antipodal data modulation in a simultaneously multiplexed system. The orthogonal spreading sequences determined for such methods (sometimes referred to as "multiple access" methods) may also be suitable for m-ary orthogonal or m-ary biorthogonal modulation, where only one of a plurality of signals is transmitted (i.e. non-multiplexed). The above-listed spreading sequences or signals may be used in this invention, as discussed hereinafter.

Error correction digital codes (ECC) are an important method of combating the effects of noise, outside interference, and self-noise in spread spectrum communication systems, regardless of the modulation method. An ECC method consists of a system (i.e. an algorithm and its implementation) of encoding an original data message through the incorporation of redundancy information together with a system for decoding the encoded message so as to recover the original message. The bit rate throughput required to represent the encoded message is larger than that of the message itself. The average ratio of the original message length to the encoded message length is known as the "code rate". As the amount of redundancy is increased, the code rate decreases, which diminishes the decoded message throughput of the system. However, the probability of error in determining the message at the receiver, after ECC decoding, is typically diminished by a much greater amount, so that the loss of some throughput in order to dramatically improve the reliability of the communication system is acceptable. A measure of the improvement is the "coding gain" of the ECC. The coding gain may be interpreted as the effective increase in the signal-to-noise ratio (SNR) brought about by the use of the ECC in a equivalent system without ECC or with reference to some other ECC method. ECC methods in which the amount of ECC applied to message bits is approximately equal for all bits are known as equal error protection (EEP) ECC methods. ECC methods in which the amount of ECC redundancy varies according to the function or purpose of the bit are known as unequal error protection (UEP) ECC methods. UEP ECC methods are typically used when the relative importance of the transmitted bits varies considerably. The conditions for continuous mobile reception may be so difficult that practical code rates are usually about one-half or less, which is equivalent to one hundred (100) percent redundancy.

A block diagram of a prior art receiver system for a biorthogonally modulated signal is shown in FIG. 1. The received RF signal is first amplified and filtered with a bandpass filter in tuner 1 to remove interference and noise which is outside of the bandwidth of the spread spectrum signal. The RF signal is typically frequency-translated to a lower frequency, known as the intermediate frequency (IF), for further processing, which simplifies the implementation. In some digital systems, the IF frequency is zero, which requires that the remaining processes be implemented with complex digital arithmetic (i.e. real and imaginary components). The tuner also accomplishes the function of automatic gain control (AGC) so that the received signal energy is made to be approximately constant for subsequent processing. The combined RF functions are abbreviated as RF tuner 1.

In many conventional FIG. 1 systems, the signal is converted (quantized) from an analog representation (i.e. voltage or current) to a digital representation by analog-to-digital converter (ADC) 3. The number of bits in the implementation of the ADC is chosen to preserve sufficient dynamic range in the digitized signal so that the irreducible error level caused by ADC quantization noise does not significantly degrade the receiver system performance. Typically, the number of bits is between six (6) and twelve (12), inclusive. The received and quantized signal is made synchronous with the transmitter in baud frequency and carrier frequency by baud clock recovery 5 and carrier frequency recovery 7 subsystems. Typically, these functional blocks are implemented with early/late or pulse-swallowing algorithms, phase-lock loops (PLLs) and voltage-controlled oscillators (VCOs), and/or frequency-lock loops (FLLs). The overall function of recoveries 5 and 7 is to eliminate frequency offsets caused by variation in components and the effect of Doppler frequency shift. The synchronization also establishes the proper timing (i.e. phase relationship) so that the magnitude of the crosscorrelation values between the possible signals in the biorthogonal signal set are at a minimum at an instance in the baud interval known as the "sampling point".

The digitized and synchronized signal is optionally equalized by adaptive equalizer 9 in order to partially correct for the effects of RF signal dispersion caused by the frequency-selective characteristics of the RF propagation channel. The equalizer also mitigates phase and amplitude errors caused by implementation loss due to analog components in the transmitter and receiver systems. Equalizer 9 may be implemented with a finite-impulse response (FIR) transversal filter or an infinite-impulse response (IIR) recursive filter or a combination thereof. The coefficients of the equalization filter are determined by a tap-weight update algorithm and are updated at a rate sufficient to reasonably track changes in the RF propagation characteristics. Some prior art methods for equalization include, but are not limited to, minimum mean square estimation (MMSE), least mean square (LMS), and recursive least square (RLS) algorithms, all of which are known.

The equalized signal is propagated to biorthogonal demodulator 11. The function of biorthogonal demodulator 11 is to determine estimates of the $log_2 M$ encoded selection bits and one encoded polarity bit in each information baud. The biorthogonal transmitter system (not shown) transmits one of the plurality of M signals from the biorthogonal signal set in each baud. The bit representation of the index of the biorthogonal signal (i.e. 1-of-M choice) is represented by the encoded selection bits. The polarity of the resulting signal is modulated in the transmitter system by multiplying the determined signal by a factor of positive unity (one) or negative unity, arbitrarily corresponding to an encoded polarity bit value of zero or one, respectively. After demodulation, the estimated section and polarity bits are organized as a serial bit sequence and processed by deinterleaver 13. The function of deinterleaver 13 is to reverse the effect of the shuffling process of the corresponding interleaver, if present, in the transmitter system (not shown). Interleaving is a method of time-diversity in which groups consisting of one or a plurality of bits are re-arranged by way of a shuffling algorithm which is a bijection. The incorporation of an interleaver in the transmitter system and consequently a deinterleaver in the receiver system is optional, but they are frequently used in mobile communication systems to combat burst errors. The deinterleaved sequence of bits is substantially similar to that after ECC encoding in the transmitter system, except for the occurrence of errors.

After deinterleaving 13, the selection and polarity bit estimates are decoded by error correction code decoder 15 in order to recover the original data message. The ECC decoder reverses the effects of the ECC encoder (not shown) in the transmitter system according to the error correction code, substantially reducing the number of bit errors after decoding. The size of the decoded message is made smaller than the message prior to decoding by an amount corresponding to the code rate factor.

The system of ECC decoder 15 implements an algorithm which is essentially the reverse of the ECC encoder in the transmitter (not shown). In the transmitter system, ECC encoding is performed after bit scrambling and prior to interleaving and biorthogonal modulation. The optimum ECC decoder is related to the optimum ECC encoder. The optimum encoder for a specific communication system depends on the expected characteristics of the error distribution at the receiver, which requires knowledge of the specific modulation method and the expected RF channel impairment. Typically, convolutional codes or block codes, or a combination thereof, are implemented in the encoder in the transmitter and corresponding ECC decoder in the receiver. Convolutional codes with soft-decision Viterbi decoding in the receiver have been found to be optimum in circumstances where the error distribution is substantially random, uncorrelated, and resembles a Gaussian function. However, in bursty environments, block codes may be preferable (e.g. binary BCH codes, Reed-Solomom codes, concatenated parity-Reed-Solomon codes, and/or quadratic residue codes). In the ECC encoder in the transmitter (not shown), the length of the scrambled source message is increased by a factor which is the reciprocal of the code rate.

After ECC decoding 15, the decoded message is propagated to descrambler 17. Scrambling in the transmitter and consequently descrambling 17 in the receiver is optional. Scrambling is typically used to eliminate long runs of consecutive binary ones and zeroes and to cause approximately equal probabilities for the occurrence of the binary digits zero and one in the transmitted source message. Scrambling may be accomplished in the transmitter by multiplying the source message bit sequence by a binary polynomial, for example a PN-sequence, using binary arithmetic. Similarly, in order to descramble the decoded bit sequence message, the decoded and synchronized bit sequence is multiplied by the same binary polynomial. The distribution of the sequence generated by the binary scrambling polynomial is approximately uniform and has a very long period. After descrambling 17, the estimated message 19 substantially resembles the source data message that was transmitted, except for the occurrence of errors.

FIG. 2 is a block diagram of the prior art biorthogonal demodulator 11 in FIG. 1 where M is two (2). The equalized signal 21 is applied to a plurality of correlators 23 and 25. Each correlator determines the inner product between the input signal 21 and a spreading signal, when properly synchronized about the sampling point. Correlators are typically implemented with integrators and sample-hold circuits in analog embodiments and multiply-accumulate (MAC) circuits in digital embodiments. The dynamic range (analog embodiment) or bit width (digital embodiment) is determined so that the irreducible error level due to the implementation does not significantly degrade the receiver performance. The spreading signals which are input to the correlators 23 and 25 are generated by signal generators 27 and 29, respectively, resulting in correlation sums 31 and 33. In general, for a biorthogonal signal set with M orthogonal or AO signals, M correlators and M signal generators are required in the receiver in order to generate M correlation sums. The signal generators are identical to those in the corresponding transmitter system where the result of only one of the signal generators is transmitted, together with polarity modulation, in each baud. For the specific embodiment where M=2, the received signal corresponds to one of two possible transmitted orthogonal or AO signals in each baud, together with polarity modulation. The correlation sums 31 and 33 are propagated to the absolute-value functions 35 and 37, respectively, which remove the polarity information from the correlation sums by discarding sign-bit information. The correlation sums are also propagated to limiters 39 and 41. The limiters (also known as 1-bit quantizer or hard-limiters) operate in a manner opposite to that of the absolute-value functions. While the absolute-value functions remove polarity information and preserve magnitude information in order to determine the selection bits, the limiters remove magnitude information and preserve only polarity information in order to determine the polarity bits.

The correlation sum magnitudes are compared by the comparison operator 43 in order to determine which of the two correlation sum magnitudes is the largest. The signal in the biorthogonal signal set corresponding to the largest correlation sum magnitude is determined to be the signal which is most likely to have been transmitted in the baud interval. The comparison operation is typically implemented with a comparator circuit. The comparator results in a binary digit which corresponds to the index of the signal which was estimated to have been transmitted. For example, in the biorthogonal transmitter system, if an encoded selection bit value of one results in the transmission of the signal corresponding to signal generator 27 in the receiver, then the comparator 43 is implemented so that it results in the binary digit one when the magnitude of the correlation sum 31 is greater than the magnitude of the correlation sum 33. Correspondingly, if an encoded selection bit value of zero in the transmitter results in the transmission of the signal corresponding to signal generator 29 in the receiver, then the comparator 43 is implemented so that it results in the binary digit zero when the magnitude of the correlation sum 33 is greater than the magnitude of the correlation sum 31. If the result of the comparison operator is ambiguous (i.e. equal correlation sum magnitudes), then the value of the comparison operator is determined randomly. The result 45 of the comparison operator 43 is the selection bit estimate.

The selection bit estimate is the control input for polarity bit multiplexor 47. Multiplexor 47 propagates only one of the plurality of limiter values, which are the multiplexor data inputs, according to the selection bit. For all representations of a multiplexor in the block diagrams in this disclosure, the control input is distinguished from the data inputs by the label "S". For polarity bit multiplexor 47, the control bits are the selection bits. Multiplexor 47 is implemented so that the limiter value corresponding to the correlation sum magnitude with the largest value is propagated. In the previous example, multiplexor 47 propagates the result of limiter 39 if the result of comparison operator 43 is binary value one. Multiplexor 47 propagates the result of limiter 41 if the result of comparison operator 43 is binary value zero. The result 49 of the multiplexor is the polarity bit estimate. The selection bit 45 and polarity bit estimates 49 are together propagated beyond biorthogonal demodulator 11 to deinterleaver 13 shown in FIG. 1.

In the general case where M is greater than two, comparison operator 43 is replaced with a "maximum-value" function. The maximum-value function results in the index value of the signal whose correlation sum magnitude is the largest. The index value is represented by $\log_2 M$ selection bits (i.e. a 1-of-M choice). Index values are organized so that the bit sequences in the transmitter and those recovered by the receiver system are identical in the absence of demodulation errors (i.e. for a particular index, the same signal is selected in the biorthogonal modulator as is determined in the biorthogonal demodulator). In general, there are a plurality of M signal generators, M correlators, and M absolute-value functions in the biorthogonal demodulator for a biorthogonal signal set with M possible orthogonal or AO signals. In general, polarity multiplexor 47 selects from one of M inputs according to $\log_2 M$ estimated selection bits. The polarity of the correlation sum with the largest magnitude is propagated as the demodulated polarity bit. The result of the demodulation of a single information baud is a sequence of $(\log_2 M)+1$ bits.

A disadvantage of the prior art biorthogonal demodulator in FIG. 2 is that soft-decision reliability information for the selection bit estimate, beyond the minimum $\log_2 M$ selection bits which represent the signal choice, is not useful in the determination of which polarity bit estimate is selected by the polarity bit multiplexor 47. The selection and polarity bit estimates are both determined in the prior art biorthogonal demodulator 11, while improvements due to soft-decision reliability information are typically not produced until after ECC decoding 15. Thus, even if the selection bit error rate is eventually reduced by ECC decoding, the selection bit error rate prior to ECC decoding, in the biorthogonal demodulator 11, may be high (e.g. $1 \times 10^{-3}$ to $1 \times 10^{-2}$), which results in a degradation in the polarity bit error rate performance.

The probability of error in determining the selection bit in prior art FIGS. 1–2, $P^S_b$, prior to error decoding, for the specific embodiment where M=2 and the RF channel impairment is additive white Gaussian noise is known to be [reference: G. R. Cooper and C. D. McGillem, *Modern Communications and Spread Spectrum*. New York: McGraw-Hill, Inc., 1986, pp. 233–234]:

$$P_b^S = 2 \cdot Q\left(\sqrt{\frac{E_S}{N_{b0}}}\right) \quad (1)$$

where $E_s$ is the energy in any one of the signals in the biorthogonal signal set, which are assumed to be equiprobable and equal in energy, $N_{b0}$ is the noise spectral density, and Q is the complementary cumulative distribution function for the Gaussian probability density function (a.k.a. the Marcum Q function) [reference: G. R. Cooper, et al., ibid., pp. 423–425]. The noise spectral density is determined by measuring only the noise power through the bandwidth of the received signal. In the general case where M is greater than two, the error event probability for the selection bits considered together as the selection word, $P_s$, is given only approximately by the union bound:

$$P^S \leq (2M-2) \cdot Q\left(\sqrt{\frac{E_S}{N_{b0}}}\right) \quad (2)$$

For the specific embodiment where M=2, the selection word error rate and the selection bit error rate are equal. However, in general, for M greater than two, the selection word error event probability, $P^S$, and the selection bit error probability, $P^S_b$, are related but unequal. In some literature references to biorthogonal modulation (e.g. G. R. Cooper, et al., ibid. pp. 233–234), the term "N" or "M" refers to the total size of the signal set, including the orthogonal or AO signals with both positive and negative polarities. In this disclosure, the term "M" refers only to the number of distinct orthogonal signals (i.e. the dimension of signal set and N=2M) since the polarity of the signal is determined by the modulation and not the signal design.

An exemplary distribution of the correlation sum values determined in the prior art biorthogonal demodulator 11 is shown in FIG. 3 with one of two possible orthogonal signals transmitted in the presence of additive white Gaussian noise. Since the signals are assumed to be equiprobable, it is sufficient to consider the possible correlation sums in the event of the transmission of only one of the signals for all baud intervals and with a fixed arbitrarily positive polarity. The abscissa values are normalized by a factor equal to the signal energy, $E_S$ in Equation (1). In the absence of noise, there would be two point masses, centered at zero (0) and positive one (+1), respectively. The presence of noise smears the point masses out into continuous distributions. Distribution region 51 illustrates the correlation between the received signal and the orthogonal signal which corresponds to the correct selection bit. Distribution region 53 represents the correlation between the received signal and the other orthogonal signal (i.e. corresponding to the incorrect determination of the selection bit). The mean abscissa value of region 53 is about zero because the two signals in the biorthogonal signal set are presumed to be orthogonal. Since the detection method for biorthogonal modulation is a comparison of correlation sum magnitudes, errors occur in overlapping region 55.

However, biorthogonal system errors also occur in regions 57 and 59 which correspond to the images of the overlapping region 55 for the opposite polarity. These additional error events are caused because the correlation sum polarity information cannot be used to determine which of the two signals was most likely to have been sent. Instead, the polarity of the correlation sum is used to determine the remaining information bit, the polarity bit. The mean abscissa values of regions 51 and 53 are separated by Euclidean distance 61 which is a distance equivalent to the signal energy when the normalization is taken into consideration.

The probability of error in determining the polarity bits in the biorthogonal receiver system of prior art FIGS. 1–2 is more complicated and depends upon the probability of error for the selection bits. FIG. 4 is a graph which illustrates an exemplary distribution of the correlation sums in the determination of the polarity bits for the biorthogonal receiver when the impairment is AWGN and the selection bit is correctly demodulated. The abscissa values are normalized as in prior art FIG. 3. Region 63 corresponds to the distribution for a positive polarity modulation (arbitrarily, binary value zero) of the transmitted signal and region 65 corresponds to the distribution for a negative polarity modulation (arbitrarily, binary value one) of the transmitted signal. If the selection bit is correctly identified, which occurs with probability ($1-P^S_b$), the conditional polarity bit error probability, $P^{P|S}_b$, is:

$$P^{P|S}_b = Q\left(\sqrt{\frac{2 \cdot E_S}{N_{b0}}}\right) \quad (3)$$

The Marcum Q function decreases monotonically as its argument is increased. Since the numerator of the radical in Equation (3) is twice that in Equation (1), the conditional error probability in determining the polarity bits is significantly smaller than that of the selection bits in Equation (1), if the selection bit is correctly identified. The argument of the Q function is typically considered as a measure of the receiver signal-to-noise ratio (SNR). The conditional polarity bit error probability given by Equation (3) has more than a three decibel advantage (i.e. factor of two in SNR), when compared to the selection bit error probability given by Equation (1). A precise determination of the SNR advantage requires inversion of Equation (1), which has no closed-form solution and can only be determined numerically. The improvement in SNR is evident by the larger Euclidean distance 67 between the possible distribution regions 63 and 65 shown in FIG. 4.

However, when the selection bits are incorrectly identified in the biorthogonal demodulator, which happens with probability $P^S_b$, the conditional probability of error for the polarity bits is one-half (½) because the polarity of the correlation sum corresponding to the incorrect biorthogonal signal is unrelated to the correlation sum of the correct signal. The polarity determination is then essentially random; in other words, a coin toss. The overall error probability for the polarity bits, $P^P_b$, is the weighted sum of the two polarity bit conditional error probabilities:

$$P^P_b = P^S_b \cdot \tfrac{1}{2} + (1-P^S_b) \cdot P^{P|S}_b \quad (4)$$

By inspection of Equation (4), even when the conditional probability of error in the determination of the polarity bits is zero, which would require an infinite SNR, the polarity bit error is still non-zero and is substantially determined by the probability of error of the selection bits, $P^S_b$. Thus, the benefit of the SNR advantage in the conditional polarity bit error rate determination shown in Equation (3) is diminished by the selection bit error rate of Equation (1), which is typically substantially worse. This is a disadvantage to the prior art method of m-ary biorthogonal demodulation when compared to simultaneously multiplexed modulation and demodulation methods such as OFDM.

The prior art biorthogonal receiver system has been previously described and shown in FIGS. 1–2. U.S. Pat. No. 4,247,943 to Malm discloses the use of orthogonal or biorthogonal codewords in a receiver system for a signal that is generated by frequency-shift keying together with local phase-shift-keying. The receiver makes use of crosscorrelation sums determined between the received signal and four orthogonal signals, corresponding to the in-phase and quadrature component at two frequencies, to demodulate the signal.

Biorthogonal codewords [reference: W. C. Lindsey and M. K. Simon, *Telecommunications Systems Engineering*, ibid., pp. 188–194] are sets of binary sequences (i.e. ones and zeroes) which are constructed so that the permissible codewords are either pairwise orthogonal or complementary to each other. Biorthogonal codes are typically used to phase-modulate a narrowband sinusoidal signal. Methods for demodulating a biorthogonal signal set and decoding a biorthogonal codeword are unrelated except superficially in that both methods require magnitude comparisons among a plurality of possible signals or codewords.

U.S. Pat. No. 4,730,344 to Saha discloses a four dimensional modulation method known as Quadrature-Quadrature Phase-Shift Keying (QQPSK). The system of the '344 patent makes use of the in-phase and quadrature components of a signal with further data shaping of each component according to two orthogonal pulse shapes. This is equivalent to simultaneous multiplexing of antipodal-modulated orthogonal signals and not biorthogonally modulated signals. The reception of antipodal signals is unrelated to biorthogonal demodulation and the receiver of the instant invention.

U.S. Pat. No. 4,700,363 to Tomlinson et al discloses a method of m-ary phase modulation and unequal error protection. The system of '363 uses m-ary phase-shift keying together with the possible use of biorthogonal binary phase codewords. In general, m-ary phase modulation is different from m-ary biorthogonal modulation because the possible phase states in m-ary phase modulation are not pairwise orthogonal or approximately orthogonal. Hence, m-ary phase modulation is unrelated to the instant invention.

Accordingly, it is apparent from the above that there exists a need in the receiving art for: (i) limiting or diminishing the coupling between the selection and polarity bit error probabilities; (ii) preserving selection bit soft-decision reliability information for use in the determination of the polarity bits; (iii) reducing the polarity bit error rate; and (iv) reducing the overall bit error rate in biorthogonal demodulation.

SUMMARY OF THE INVENTION

This invention fulfills the above-described needs in the art by providing a method and system for the reception of a biorthogonally-modulated signal. The receiver method is compatible with prior art biorthogonal modulation methods.

According to certain embodiments of this invention, the polarity bit error rate is made to be substantially independent of the selection bit error rate. This is accomplished by weakening the coupling mechanism between the error probabilities of the selection and polarity bits through the use of coding gain from the error correction code. The selection bits are first demodulated and the error correction code corresponding to the selection bit information is completely decoded. The resulting estimate of the data message for the selection bits is then re-encoded using the same ECC code as in the biorthogonal transmitter system. As a result of the coding gain of the ECC code, the error rate of the re-encoded selection bits is substantially lower than that of the selection bit estimates prior to decoding. The re-encoded selection bits are then used to determine which correlation sums are examined in order to determine the polarity bits in the biorthogonal receiver. While the error rate of the polarity bits is directly determined by the selection bit error rate in the prior art receiver, according to the invention, the polarity bit error rate is substantially determined by the conditional error probability of the polarity bits alone. As a result, the overall error rate of the biorthogonal receiver is improved.

In addition to the improved error rate compared to prior art biorthogonal receiver systems, the method is shown to preserve soft-decision reliability information in the determination of the selection bits. In the prior art biorthogonal demodulator and receiver system, additional soft-decision reliability information for the selection bit estimates, beyond the minimum number of bits required to represent the selection bit choice, is not useful in the determination of the polarity bits because the determination as to which correlation sum polarity is relevant is implemented in the biorthogonal demodulator, prior to decoding of the error correcting code. According to the invention, by postponing determination of which polarity bit estimate is relevant until after ECC decoding and re-encoding of the selection bits, a normalized comparison metric is utilized in the biorthogonal demodulator in order to determine the selection bit estimate, which preserves soft-decision reliability information and is insensitive to gain variations in the received signal strength.

DETAILED DESCRIPTION OF CERTAIN EMBODIMENTS OF THIS INVENTION

Figure 1:
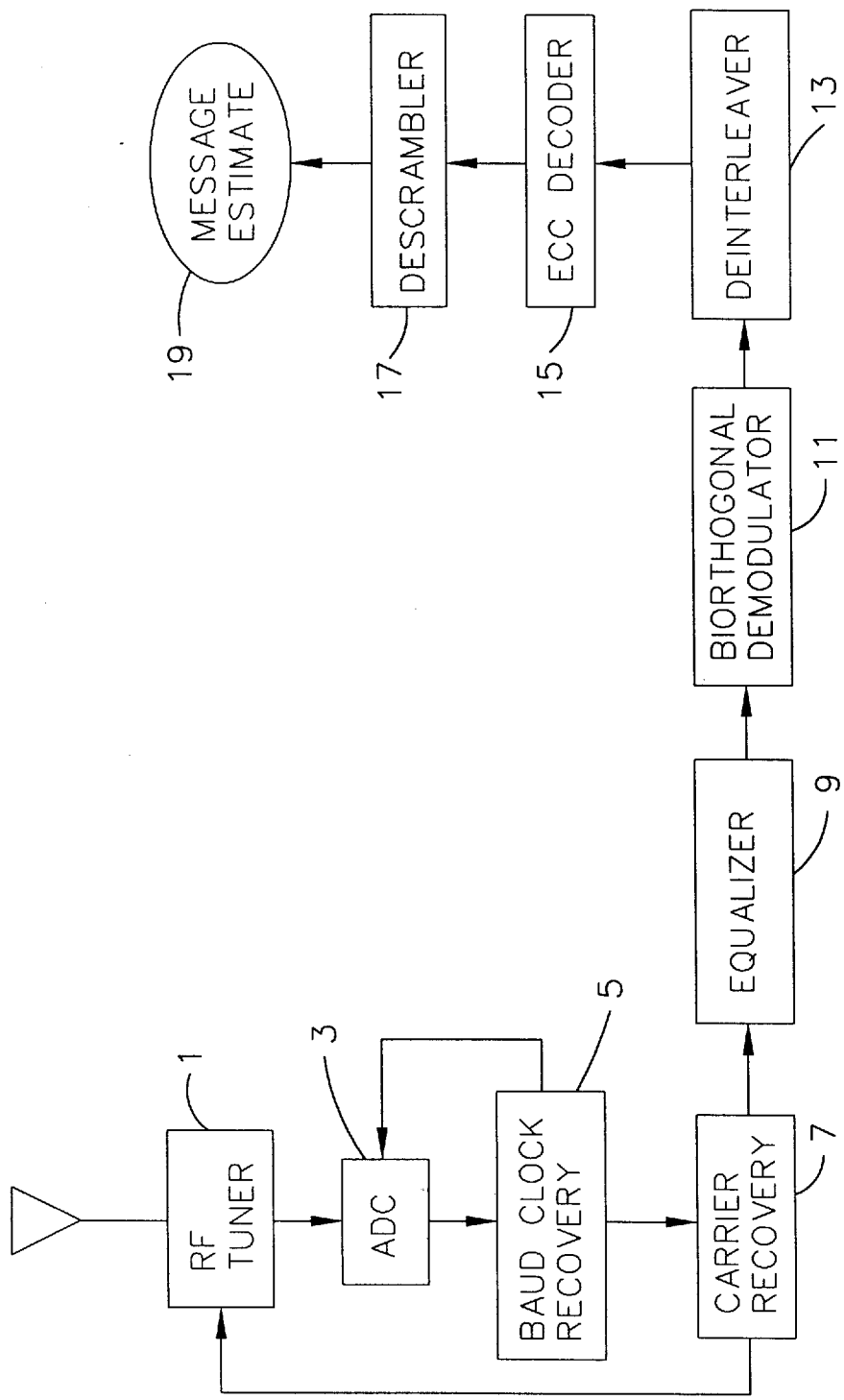
FIG. 1 is a block diagram of a prior art biorthogonal receiver.

Referring now more particularly to the accompanying drawings in which like reference numerals indicate like parts throughout the several views.

Figure 5:
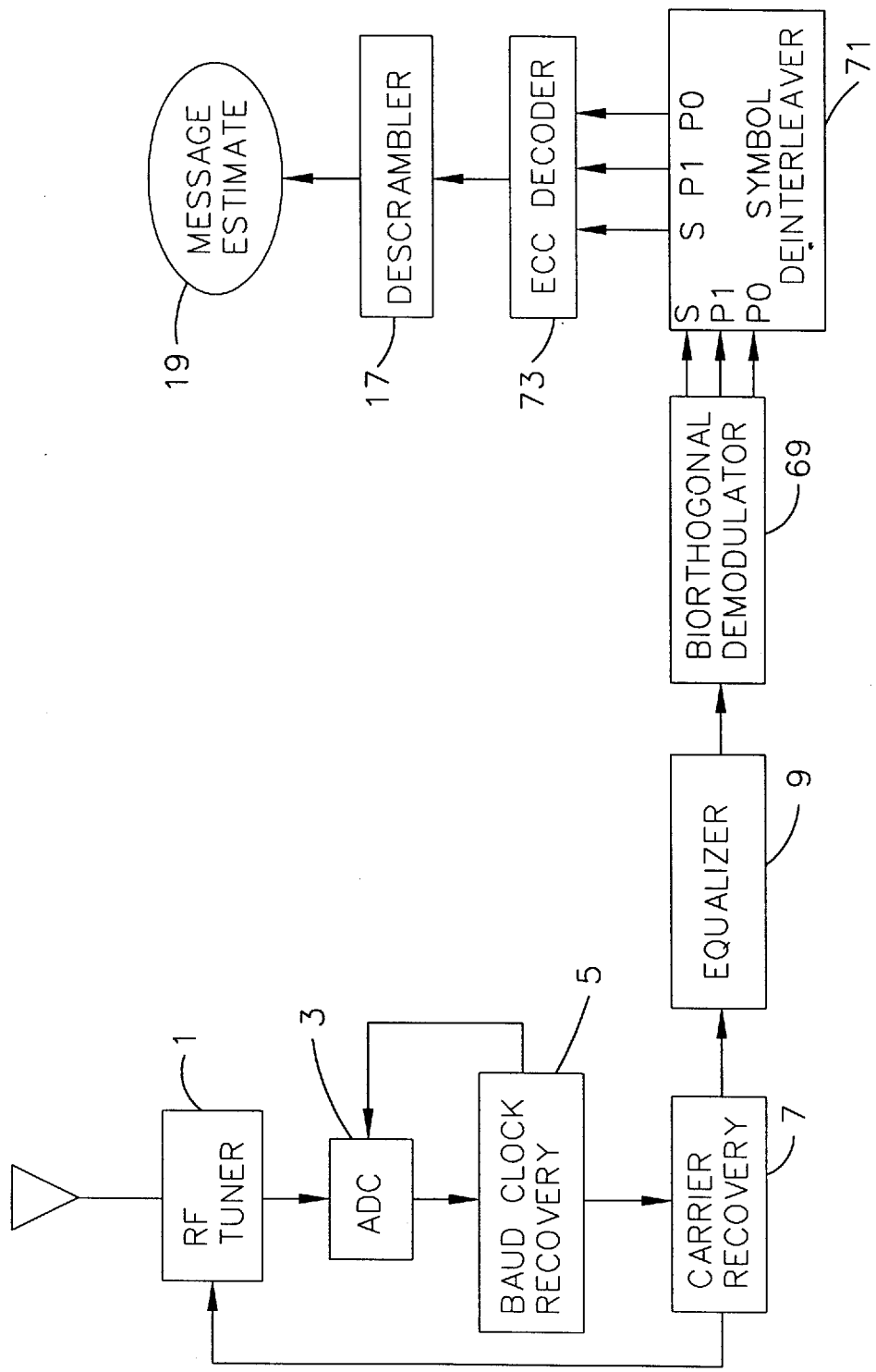
FIG. 5 is a block diagram of a receiver system for biorthogonal demodulation according to an embodiment of this invention.

FIG. 5 is a block diagram of the biorthogonal receiver system according to the invention. The functions of the RF-tuner 1, ADC 3, baud clock recovery 5, carrier frequency recovery 7, equalizer 9, and descrambler 17 in the biorthogonal receiver system are as in the prior art biorthogonal receiver of FIG. 1. The prior art biorthogonal demodulator 11 in FIG. 1 is replaced with the biorthogonal demodulator of the invention 69 in FIG. 5, which is shown in further detail in FIG. 6 for the specific embodiment where M is two (2). Deinterleaver 13 in FIG. 1 is replaced with symbol deinterleaver 71 with a specific internal structure. The prior art ECC decoder 15 in FIG. 1 is replaced with multiple-step ECC decoder 73 (see FIG. 5), which is shown in detail in FIG. 7.

In general, there are two types of interleavers that may be implemented in a communication system, (i) "bit" interleavers and (ii) "symbol" interleavers in the transmitter system with corresponding bit and symbol deinterleavers in the receiver. The difference between bit interleaving and symbol deinterleaving is that, in a symbol interleaver, while the ordering of groups of bits are shuffled so as to eliminate probable temporal correlation between adjacent groups, the bit ordering within each group of bits is preserved by the shuffling process. In a bit interleaver, no specific ordering among adjacent bits is preserved. According to the method, symbol deinterleaving is required in the receiver system of this invention, and consequently symbol interleaving is used in the transmitter in order to preserve the association between the selection and polarity bits in each baud.

Figure 2:
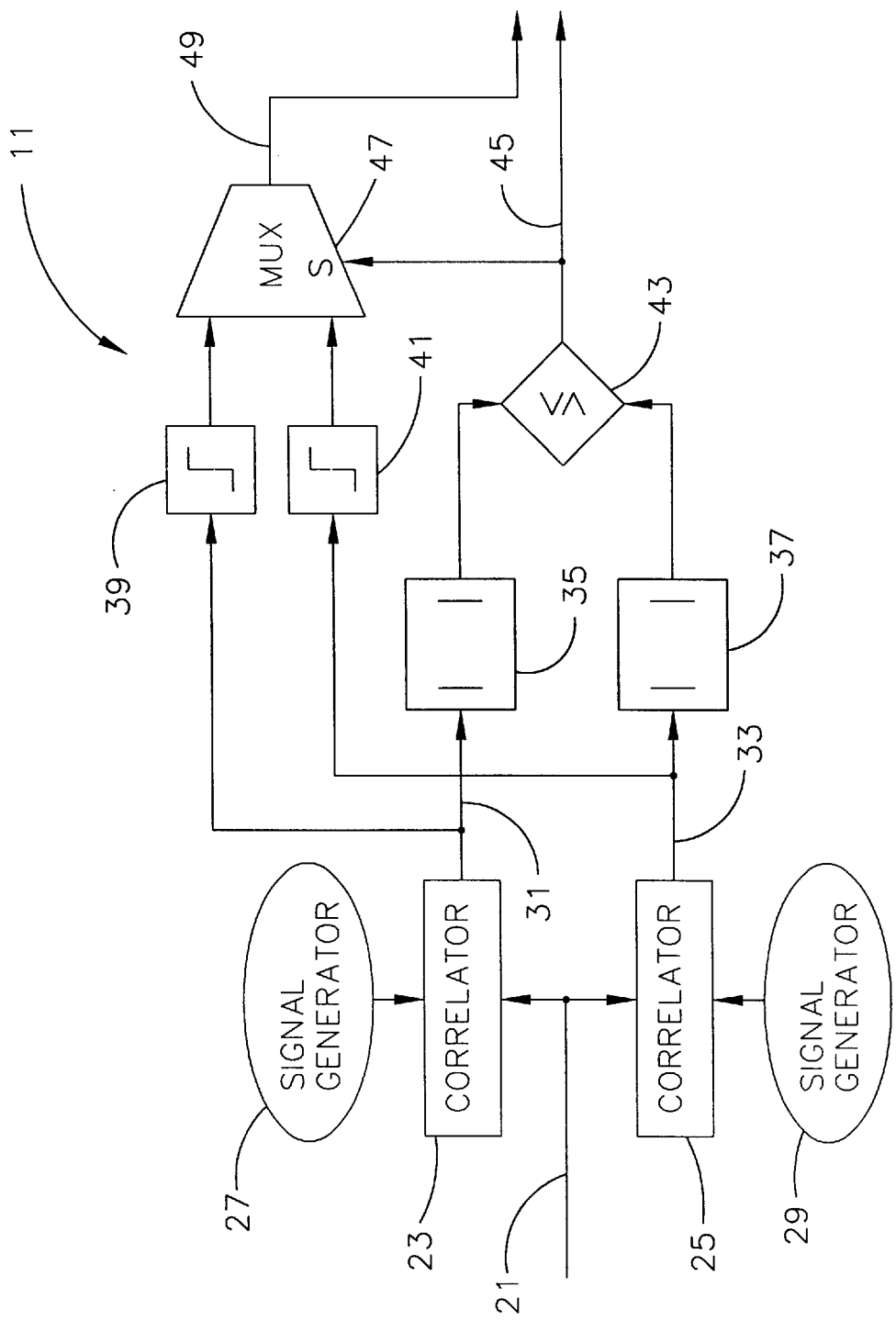
FIG. 2 is a block diagram of a prior art method of biorthogonal demodulation in the FIG. 1 receiver.
Figure 3:
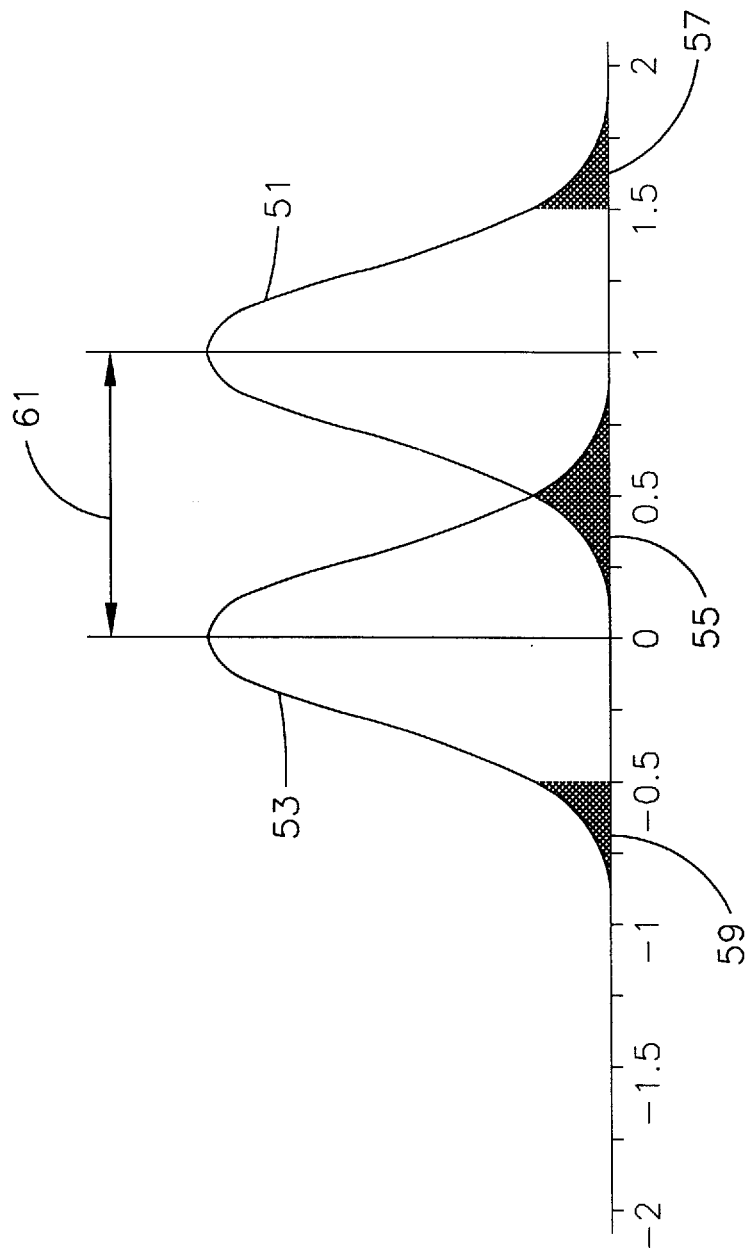
FIG. 3 is a graph illustrating an exemplary distribution of the correlation sums at the sampling point in the determination of the selection bit in the FIG. 2 prior art biorthogonal demodulator when the RF impairment is additive white Gaussian noise (AWGN).
Figure 4:
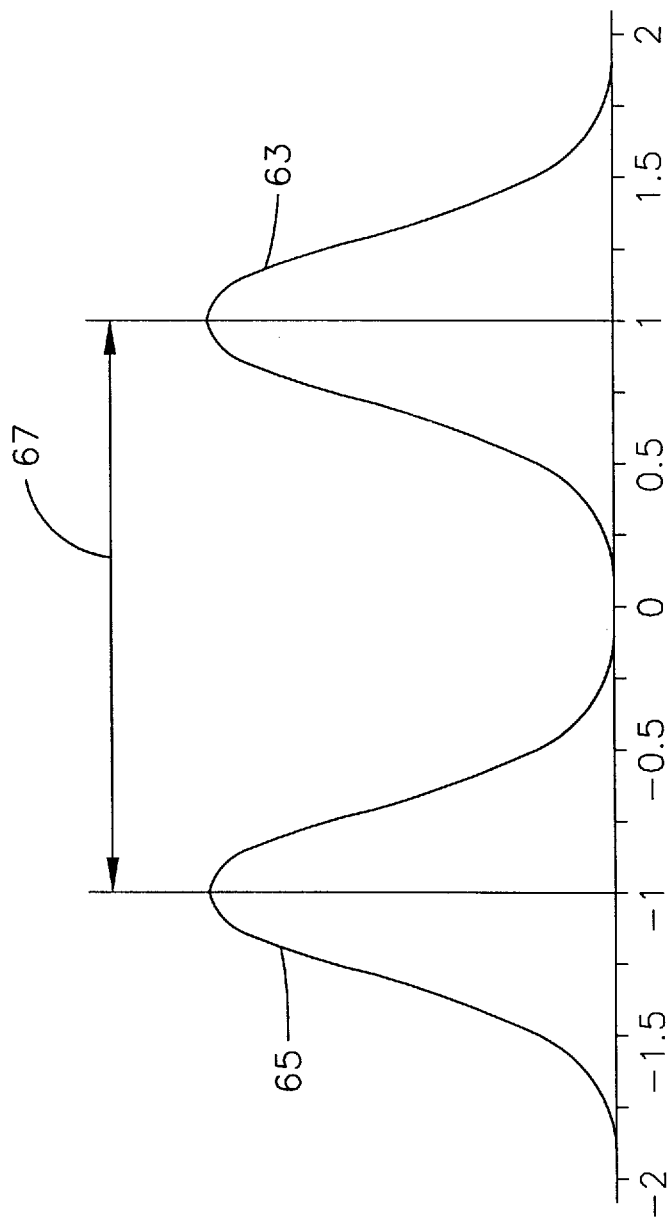
FIG. 4 is a graph illustrating an exemplary distribution of the correlation sums at the sampling point in the determination of the polarity bit in the prior art FIG. 2 biorthogonal demodulator when the impairment is AWGN and the selection bit is correctly demodulated.
Figure 6:
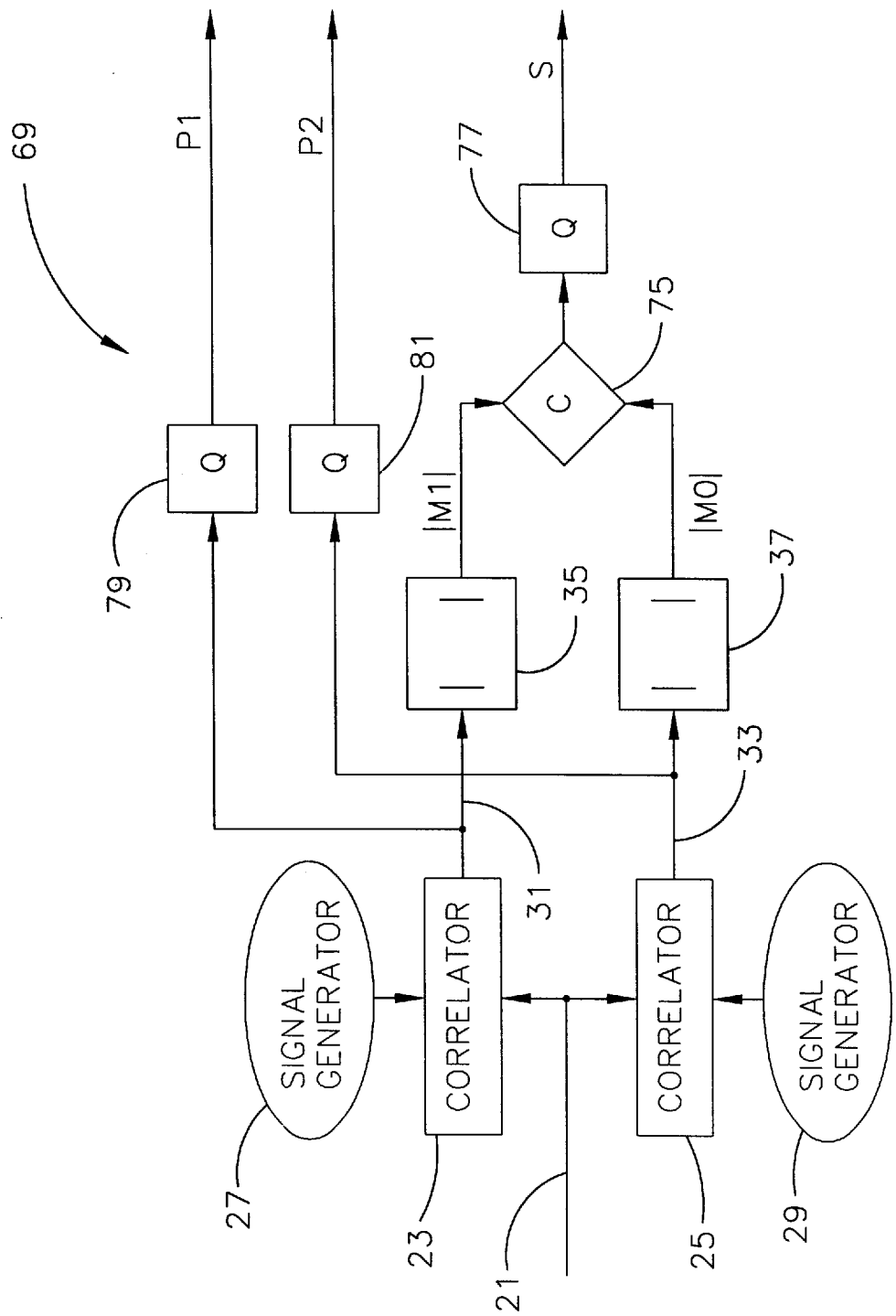
FIG. 6 is a block diagram of the biorthogonal demodulator for the receiver in the FIG. 5 system where M is two (2).

With reference to FIG. 6, which is the embodiment of biorthogonal demodulator 69 where M=2, the received signal 21, correlators 23 and 25, signal generators 27 and 29, and absolute-value functions 35 and 37, are as the prior art biorthogonal demodulator of FIG. 2. Consequently, correlation sums 31 and 33 and their magnitudes are also as before. However, comparison operator 43 in prior art FIG. 2 is replaced with normalized comparison metric, C 75, in FIG. 6, which, according to the invention, is computed when M equals two as the ratio:

$$C = \frac{|M_1| - |M_0|}{\max(|M_1|, |M_0|)} \quad (5)$$

where $|M_1|$ is the absolute value of correlation sum 31 between received signal 21 and the signal from generator 27, $|M_0|$ is the absolute value of correlation sum 33 between the received signal 21 and the signal from generator 29, and max($|M_1|, |M_0|$) is a function with two operands which results in the larger of the operands $|M_1|$ and $|M_0|$ (i.e. maximum-value function). In certain embodiments, the signals are implemented as multiple bit digital sequences and the correlation sums, ratios, and maximum-value functions are implemented with digital arithmetic. If the representation of the received signal requires complex digital arithmetic (i.e. real and imaginary components), the absolute-value functions are equivalent to complex magnitude functions. The result of Equation (5) is quantized to a lesser number of bits by quantizer 77 and propagated as "S" beyond biorthogonal demodulator 69. For proper operation with this configuration, signal generator 27 in the demodulator has a corresponding signal generator in the modulator in the transmitter system (not shown) which is emitted for an encoded selection bit value of one. Furthermore, a positive-valued metric C 75 is associated with a demodulated selection bit value of one. Similarly, signal generator 29 in the demodulator has a corresponding signal generator in the modulator in the transmitter system (not shown) which is emitted for an encoded selection bit value of zero. A negative-valued metric C 75 is associated with a demodulated selection bit value of zero.

The number of bits required after quantization 77 of the normalized comparison metric depends upon the implemented ECC method. If the ECC decoder is able to make use of soft-decision reliability information, then additional bits beyond the minimum of one-bit are preserved by the quantizer. For example, in certain embodiments, convolutional error coding is applied to the selection bits in the transmitter system (not shown) with corresponding soft-decision Viterbi decoding in the receiver system. Soft-decision convolutional decoding requires a minimum of three bits (i.e. two additional reliability bits for a total of eight possible states) to achieve negligible implementation loss when compared to an implementation with an infinite number of bits. Additional bits beyond three may also be implemented, but the improvement in performance is minor and the memory requirement for the deinterleaver is unnecessarily increased.

In certain embodiments, the ECC method requires only hard-decision (i.e. one bit) decoding of the ECC code. For hard-decision decoding, only one demodulated selection bit is preserved by quantizer 77. It has been previously described that for proper operation with the configuration shown in FIG. 6, the one bit to be preserved is binary value one when the metric C is positive, binary value zero when the metric C is negative, and arbitrarily binary value one or zero, when metric C is exactly zero. When C is zero, the selection bit estimate is ambiguous.

The limiters 39 and 41 in prior art FIG. 2 are replaced with polarity quantizers 79 and 81 in FIG. 6. The optimum bit width of quantizers 79 and 81 depends upon the ECC coding that is applied to the polarity message bits in the transmitter system. Some ECC methods are able to make use of additional reliability information to substantially improve the decoded-error rate performance. For example, Viterbi soft-decision decoding of convolutional codes has about a three decibel advantage compared to hard-decision (no reliability information) decoding. For Viterbi soft-decision decoding, the optimum bit width is about three (3) bits, but only one bit is required for each quantizer. For hard-decision decoding of certain ECC codes, the function of quantizers 79 and 81 becomes equivalent to limiters 39 and 41 since one-bit quantization is the same as limiting. A key difference between the FIG. 6 method and the prior art method for biorthogonal demodulation shown in FIG. 2 is that the polarity information for both of the correlation sums is propagated beyond the biorthogonal demodulator as "P1" and "P0". No determination as to which of the polarity bit estimates (i.e. "P1" or "P0") is related to the demodulated selection bit "S" is made until after ECC decoding 89 of the selection bits according to certain embodiments of this invention.

If soft-decision reliability information is preserved, the multiple bits representing the estimate of the selection bit must be organized so as to be useful of the ECC decoder algorithm. For example, Viterbi decoding methods typically compute digital metrics (sums) which are used in the determination of the most probable bit sequence. The implementation of the digital arithmetic used for the metric is either "twos-complement" or "sign-magnitude", but more preferably "twos-complement". The types of arithmetic used in the implementation of normalized comparison metric 75 and the quantizers 77, 79, and 81 must be consistent with the type of digital arithmetic used in the ECC decoding algorithm.

Receivers for mobile communication systems include automatic-gain-control (AGC) subsystems in RF tuner 1, which attempt to minimize the fluctuations in the received signal energy and consequently amplitude. However, the reaction time of an AGC subsystem is limited, particularly when there is an abrupt change in signal energy. During the transition interval, the received signal amplitude varies before stabilization. When the receiver is in-motion in environments with dense natural or man-made structures, the signal gain varies widely due to multipath propagation, and the received signal gain, even after AGC, may vary continuously. The prior art comparison operator 43 in FIG. 2 is insensitive to gain variations because it is a comparison of the magnitude of correlation sums 31 and 33. The correlation sums 31 and 33 are proportional to the sum of the product of the received signal 21 and the respective signal generators 27 and 29. Therefore, a non-zero scale factor change in the received signal amplitude affects both correlation sums equivalently, and does not change the result of comparison operator 43. Unfortunately, as described previously, the comparison operator does not preserve any soft-decision reliability information for the selection bits, which results in a loss in performance for soft-decision decoding of certain ECC codes (i.e. convolutional codes with Viterbi decoding). In contrast, normalized comparison metric, C 75, according to Equation (5), preserves reliability information and is still insensitive to non-zero scale factor changes in the received signal amplitude. The numerator of the ratio C 75 is a difference of correlation sum magnitudes, which varies with scale factor changes in the received signal amplitude. The denominator of the ratio C 75 is either of the correlation sum magnitudes, whichever is largest, and hence also varies with scale factor changes. Thus, the scale factor change is common to the numerator and the denominator and it has no effect on the value of the ratio.

In addition to making the estimated selection bit and reliability bit information (together as metric C) insensitive to gain variations, the normalization in Equation (5) which is the result of dividing by the maximum correlation sum magnitude causes comparison metric C 75 to be primarily limited to values between plus one (+1) and minus one (+1), inclusive. Fractional values are typically implemented with either floating-point digital arithmetic or fixed-point digital arithmetic. Fixed-point implementations typically require less hardware. Since only a few bits (less than four) are typically required for optimum operation of the soft-decision ECC method, fixed-point binary digital arithmetic is preferred according to certain embodiments.

Even the determination of only a few bits in the ratio (5) may represent a substantial increase in the receiver complexity in some embodiments. The denominator part of Equation (5) may be omitted (i.e. just determining the difference in correlation sum magnitudes), but the reliability information is then significantly more sensitive to uncompensated gain fluctuations. Furthermore, normalized comparison metric 75 can be replaced altogether with a comparator, such as comparison operator 43 in prior art FIG. 2. The receiver is then insensitive to gain fluctuations but does not preserve additional reliability information.

The polarity bit estimates "P1" and "P0" in FIG. 6 are more sensitive to gain fluctuations because their determination does not involve a comparison of values which together vary with changes in received signal amplitude. Furthermore, gain-changes which result in signal inversion (i.e. negative scale factors) will adversely affect the polarity bit error rate unless the polarity bits are encoded differentially (i.e. differential binary phase-shift keying, also known as DBPSK or DPSK). However, in general, the effects of gain variations are less detrimental to the polarity bit error performance because of the SNR advantage in the determination of the polarity bit estimates. Negative scale factors do not affect the selection bit estimate because of the absolute-value functions.

According to certain embodiments of this invention, in biorthogonal demodulator 69 shown in FIG. 6, both correlation sums 31 and 33, which correspond to the crosscorrelation between the received signal and the two signals in the biorthogonal signal set, are propagated after quantization as polarity bit estimates "P1" and "P0", together with the estimated selection bit "S". Unlike the prior art receiver of FIG. 2, the biorthogonal demodulator 69 does not determine which of the polarity bit estimates is relevant. Therefore, the demodulation of the polarity bits is incomplete when leaving the demodulator.

Biorthogonal demodulator 69 generates sequences of bits ("S", "P1", and "P0") which correspond to the quantized normalized comparison metric and quantized correlation sums. In the general case with M orthogonal signals in the biorthogonal signal set, one comparison metric (which may include reliability information), representing $\log_2 M$ estimated selection bits, and M correlation sums, representing all of the possible estimates for the polarity bit, are propagated to deinterleaver 71.

Figure 7:
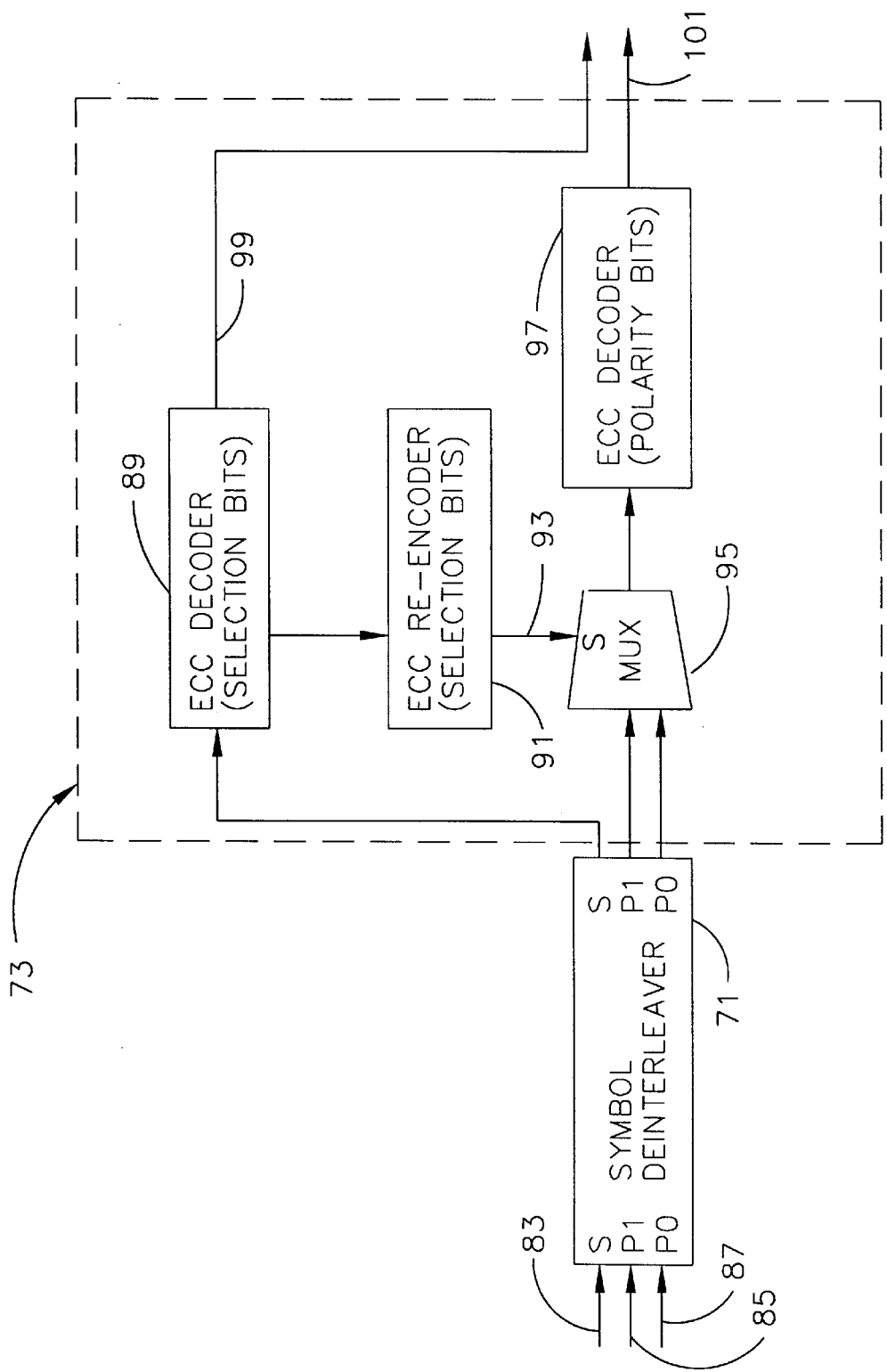
FIG. 7 is a block diagram of the symbol deinterleaver, polarity bit demodulator, and error correction decoder subsystems in the FIG. 5 receiver system.

With reference to FIG. 7, the input bit sequences to symbol deinterleaver 71 are the quantized normalized comparison metric selection bit estimate 83 and the two quantized correlation sums 85 and 87, corresponding to the polarity bit estimates, for the specific embodiment where M=2. The symbol deinterleaver reverses the shuffling implemented in the corresponding symbol interleaver in the biorthogonal transmitter system (not shown).

A specific internal structure is provided for symbol deinterleaver 71. The requirement for a specific deinterleaver structure necessitates a corresponding requirement for a specific interleaver (not shown) structure. According to the receiver system of the invention, symbol deinterleaving (and interleaving) is required to preserve the relationship between the polarity and selection bits. The requirement for a symbol deinterleaver is a consequence of the receiver system of the invention, where the determination as to which polarity bit estimate is relevant to a specific demodulated selection bit estimate is delayed until after ECC decoding and re-encoding of the selection bits.

The minimum bit width for the symbol deinterleaver depends upon the number of bits used to represent the selection and polarity bit estimates. If the normalized comparison metric "S" is represented by a plurality of $B_S$ bits and each of the M correlation sums ("P1" and "P0" in FIG. 6) are represented by a plurality of $B_P$ bits, then the minimum deinterleaver symbol size is $B_S+M \cdot B_P$ bits. This is the nominal length for binary ECC codes such as most convolutional codes. For example, in the specific embodiment where M=2, if three (3) bits are used to represent the selection bit estimate and each of the correlation bit estimates, the minimum symbol size is nine (9) bits. The symbol size may be increased by integer multiples in order to achieve optimum performance for multiple-bit block codes (e.g. Reed-Solomon codes). When compared to the prior art receiver for biorthogonal signals, the memory requirement of symbol deinterleaver 71 is increased compared to deinterleaver 13 in FIG. 1 because of the requirement to preserve the plurality of M correlation sums, corresponding to the polarity bit estimates. In prior art deinterleaver 13, only one polarity bit estimate is propagated beyond prior art biorthogonal demodulator 11 because the polarity bit is completely demodulated in the biorthogonal demodulator. The use of hard-decision (one-bit) limiting for polarity bit quantizers 79 and 81 in FIG. 6 minimizes the required amount of additional memory for symbol deinterleaver 71, at the cost of a sacrifice in error performance compared to soft-decision decoding.

In the corresponding transmitter system (not shown), soft-decision reliability information is irrelevant since the information source is known. According to the instant invention, a symbol interleaver (not shown) replaces the interleaver, if present, in the transmitter system. The minimum bit width for the symbol interleaver is two bits for the specific embodiment where M=2 so that the pairing between polarity and selection bits, presumed to be adjacent to one another, is preserved through the shuffling process. Typically, the selection and polarity bits are organized as serial bit-pairs and the symbol size is then two serial bits. The size may be increased beyond two bits by an integer multiple. In the general case, where the biorthogonal signal set has M orthogonal or AO signals, there are $\log_2 M$ selection bits and one polarity bit in each information baud, so that the minimum symbol size in the symbol interleaver in the transmitter system (not shown) is $(\log_2 M)+1$ bits, or an integer multiple thereof. Use of the method does not typically increase the size of memory requirement for the interleaving function in the transmitter system. If an integer multiple of the symbol size is implemented, then the same integer multiple must be implemented in symbol deinterleaver 71 of the receiver system.

In the prior art receiver system of FIGS. 1–2, the polarity and selection bits are together substantially determined in the biorthogonal demodulator 11. Therefore, there is no specific requirement for the deinterleaver structure. The relationship between the polarity and selection bits need not be preserved by the shuffling algorithm because no further information from the selection bits is required in order to determine the polarity bits, in other words, the remaining decoding processes are independent. However, in the receiver system of FIGS. 5–8, according to certain embodiments of this invention, the determination as to which polarity bit estimate is relevant occurs subsequent to symbol deinterleaver 71 in multi-step ECC decoder 73. If symbol deinterleaver 71 re-orders the relationship between a specific selection bit estimate and the plurality of M polarity bit estimates, then after the shuffling process, it may be very difficult to implementing the tracking means in order to determine which polarity bit estimate is related to a specific selection bit estimate. If the selection bit is incorrectly identified, whether by error or by examination of the wrong corresponding polarity bit estimate, the polarity bit error probability increases substantially, as shown in Equation (4).

The direct coupling between the probability of error for the selection and polarity bits is a disadvantage of the prior art biorthogonal demodulator shown in FIG. 2. According to the instant invention, the receiver system of FIGS. 5–8 effect to diminish the coupling between the selection bit and polarity bit error probabilities. FIG. 7 is a block diagram of symbol deinterleaver 71, multiple step error correction code decoder 73, and the remaining subsystem for polarity bit demodulation for the specific embodiment where M=2. After symbol deinterleaving 71 of the selection bit estimate 83 and the two polarity bit estimates 85 and 87 together as a single symbol, the encoded selection bit estimate is ECC decoded by selection bit ECC decoder 89 according to the ECC method in order to determine the estimated (but still scrambled) source message bits, which where associated with the encoded selection bits by the corresponding ECC encoder in the transmitter system (not shown). The decoded selection message bits are then re-encoded by selection bit ECC re-encoder 91. The characteristics of ECC re-encoder 91 in the receiver system and the corresponding ECC encoder in the transmitter system are identical in regard to the selection bits; in other words, in the absence of any errors in the selection bit estimate, the re-encoded selection bit sequence is identical to the transmitted encoded selection sequence. In certain embodiments where the ECC code method is a state-machine with memory (e.g. convolutional codes), ECC re-encoder 91 is preset to the same initial state as the corresponding ECC encoder in the transmitter system. The initial or preset state may be the all-zeroes state, for example. The use of convolutional coding has the advantage, compared to most block codes, that the implementation of re-encoder 91 is straightforward and requires a minimal amount of hardware. Convolutional encoders (and re-encoders) are implemented with tapped linear shift-feedback registers, such as described by A. J. Viterbi [reference: A. J. Viterbi, "Convolutional codes and their performance in communication systems," ibid.].

The function of ECC re-encoder 91 is to generate the encoded selection bit sequence from the decoded selection message bit estimate. The re-encoded selection bit sequence 93 will have considerably fewer errors as compared to the selection bit estimate "S" determined in biorthogonal demodulator 69, prior to ECC decoding, because of the effect of ECC coding gain, whereby the coding overhead (redundancy) is used to diminish the probability of error. The re-encoded selection bits are used to determine which one of the polarity bit estimates ("P1" and "P0" in FIG. 7), after deinterleaving 71, is propagated by multiplexor 95. Once the determination as to which of the polarity bit estimates is relevant is made by selecting between the estimates, the polarity bit estimate is completely demodulated and is ECC decoded by the remaining polarity bit ECC decoder 97. The multiplexor 95 selects the polarity estimate that corresponds to the re-encoded selection bit estimate. For example, if, as the result of an RF channel impairment, the magnitude of correlation sum 33 is larger than the magnitude of correlation sum 31, even though the signal corresponding the signal generator 27 had actually been transmitted (corresponding to encoded selection bit value one), the estimated selection bit, prior to ECC decoding, would be bit value zero. In prior art biorthogonal demodulator 11, the polarity bit estimate "P0" would be erroneously propagated. However, if as the result of ECC decoding and ECC re-encoding according to the invention, the bit error were corrected as the result of the ECC coding gain, then the re-encoded selection bit is one, not zero, and the polarity bit estimate "P1" is correctly propagated for ECC decoding.

The polarity bit ECC decoder 97 decodes the ECC code according to the ECC coding method that was applied to the polarity bits. After ECC decoding, the decoded selection bits 99 and polarity bits 101 are both propagated beyond the ECC decoder subsystem 73 for final descrambling 17, described previously, which results in source message estimate 19. The ECC methods for use with the selection bits and the polarity bits may be identical, but in general, they are independent and may be unrelated (e.g., convolutional encoding of the selection bits and block encoding of the polarity bits).

The error probability for the polarity bits is described by Equation (4) for the FIG. 2 prior art biorthogonal demodulator. However, Equation (4) is not relevant to the biorthogonal receiver system of this invention because it does not take into consideration the effect of coding gain due to ECC decoding and re-encoding of the selection bits. According to certain embodiments of this invention (FIGS. 5–8), it has been discovered that the probability of error, $P^P_b$, prior to ECC decoding 97 of the polarity bits is:

$$P^P_b = P^{S,D}_b \cdot \tfrac{1}{2} + (1 - P^{S,D}_b) \cdot P^{P|S}_b \qquad (6)$$

where the error probability of the selection bit, $P^S_b$, as in Equation (4), is replaced with the error probability of the selection bit after ECC decoding 89 and re-encoding 91, $P^{S,D}_b$. The value of $P^{S,D}_b$ is typically several orders of magnitude smaller than $P^S_b$ because of the ECC coding gain except when the error rate is extremely high (around $1 \times 10^{-1}$), where the performance of ECC methods, in general, deteriorates.

For practical SNR values where the receiver system is expected to properly operate (typically greater than about 4 decibels), the re-encoded selection bit probability of error is sufficiently small that it may be ignored (i.e. $P^{S,D}_b < 1 \times 10^{-3}$ implies $1 - P^{S,D}_b \approx 1$). By Equation (6), the polarity bit error rate, $P^P_b$, prior to its own specific ECC decoding 97, is then approximately equal to the polarity bit conditional error probability, $P^{P|S}_b$, which, according to Equation (3), is independent of the selection bit error rate. Thus, certain embodiments of the invention cause the error rates of the selection and polarity bits to be substantially decoupled. For a specific receiver SNR, the determination of the polarity bits in Equation (3) then has an advantage of more than three decibels compared to the determination of the selection bits in Equation (1). As a result, less ECC coding is required (i.e. a higher code rate is possible) for the polarity bits in order to achieve the same error rate performance as the selection bits.

The probability of error in determining the selection bits, prior to ECC decoding, is still given by Equation (1), according to certain embodiments of this invention. The overall bit error rate is determined by the weighted sum of the probability of error of the polarity and selection bits. In general, a biorthogonal signal represents $\log_2 M$ selection bits and one polarity bit. If the selection bit error rate is $P^S_b$ and polarity bit error rate is $P^P_b$, the overall error rate, $P_b$, is:

$$P = \frac{\log_2 M}{1 + \log_2 M} \cdot P^S_b + \frac{1}{1 + \log_2 M} \cdot P^P_b \qquad (7)$$

The selection bit error rate is unchanged if the same ECC method is in the prior art biorthogonal modulator is implemented. The polarity bit error rate is substantially lower, so that the overall error rate is also made lower by the use of the invention. For the specific embodiment where M=2, there are equal numbers of selection and polarity bits and the improvement in the polarity bit error rate is more significant than for values of M greater than two, where there are substantially more selection bits than polarity bits.

The block diagram of the biorthogonal demodulator in FIG. 6 is the specific embodiment where M=2. The FIG. 8 block diagram shows the specific embodiment of the biorthogonal demodulator where M=4. The FIG. 8 diagram is further extended to the general case where M is greater than two and a binary power of two (four, eight, sixteen, and so on). In general, for a biorthogonal signal set with a plurality of M orthogonal or AO signals, only one of which is transmitted in a single baud, there is a plurality of M correlators 103, M signal generators 105, M absolute-value functions 107, and M correlation sum quantizers 109. The correlators determine a plurality of M correlation sums 111. The normalized comparison metric 75 in the FIG. 6 embodiment is not useful for M greater than two because it is only defined for the M=2 case in Equation (5). The normalized comparison metric 75 is replaced in FIG. 8 with the maximum-value index function 115. The maximum-value index function 115 has a plurality of M inputs, which are the correlation sum magnitudes. The function 115 determines the selection index 113 of the largest correlation sum magnitude. The selection index 113 represents a 1-of-M choice, which is equivalent to $\log_2 M$ selection bits. For example, for the specific embodiment where M=4, if the correlation sum magnitudes between the received signal 21 and the four signals in the biorthogonal signal set are $|M_0|$, $|M_1|$, $|M_2|$, and $|M_3|$, where the subscript refers each of the four possible values of the two bit binary index (arbitrarily, two bit binary values "00", "01", "10", and "11", respectively), then the function 115 determines the two selection bit estimates 113 "S1" and "S0", represented together as index i, so that:

$$|M_i| = \max_i \{|M_0|,|M_1|,|M_2|,|M_3|\} \tag{8}$$

In other words, the function 115 determines the maximum value correlation sum magnitude and propagates the estimated selection bits which correspond to the signal in the biorthogonal signal set whose crosscorrelation with the received signal resulted in the maximum magnitude.

Figure 8:
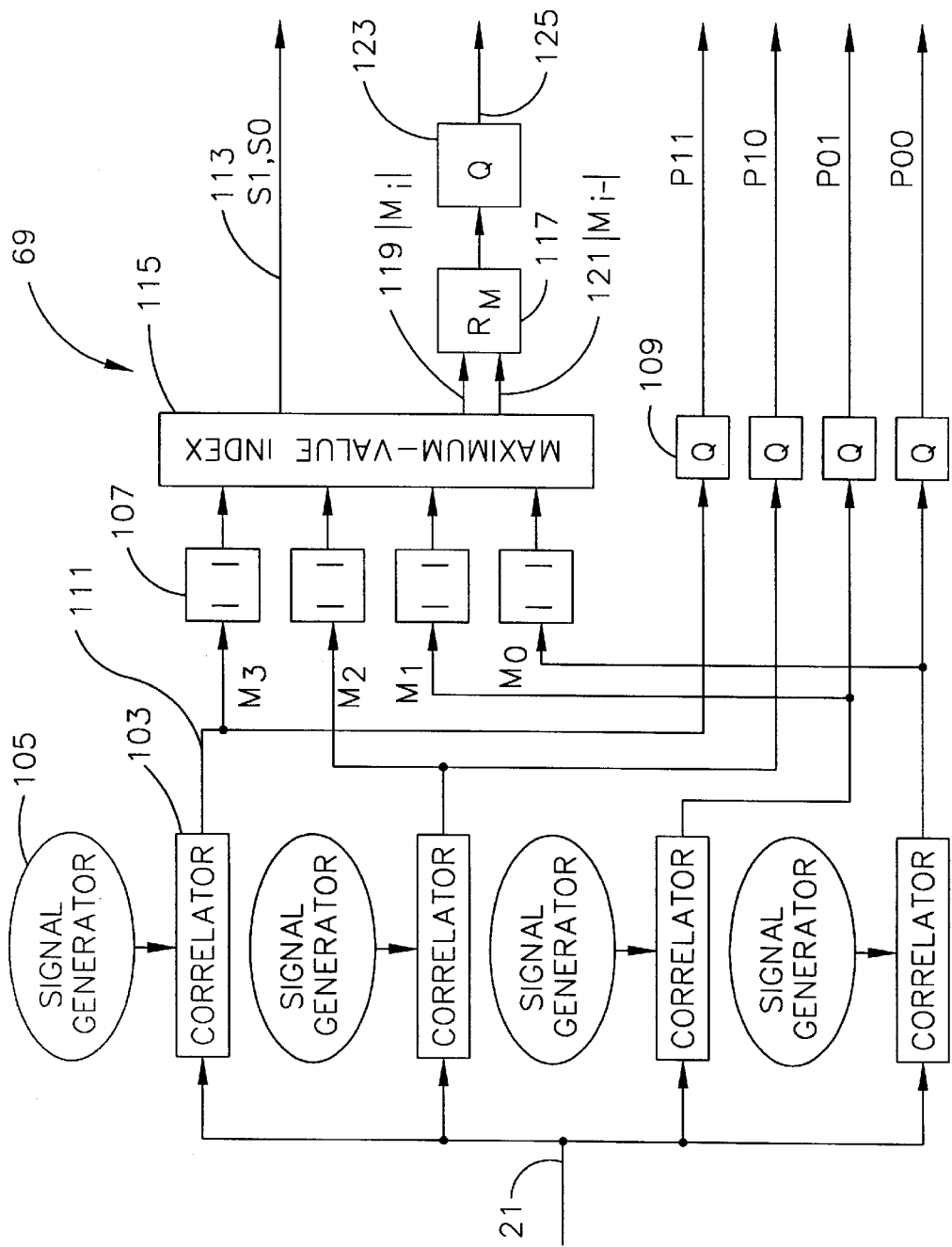
FIG. 8 is a block diagram of the biorthogonal demodulator in the receiver system, of FIG. 5, for the embodiment according to the invention when the value of M is four (4).

The selection bit estimate generated by the function 115 according to Equation (8) represents the index of the signal in the biorthogonal signal system which is most likely to have been sent. However, the function, according only to Equation (8), does incorporate any soft-decision reliability information. The selection bit estimate with $\log_2 M$ bits is the minimum amount of bit information required to represent the 1-of-M signal choice and so cannot be quantized further. Thus, the selection bit quantizer 77 is omitted. It has been discussed previously that for optimum decoding of convolutional codes with the Viterbi algorithm, reliability information in the form of additional information bits can substantially improve the decoded bit error rate. In the biorthogonal demodulator of FIG. 6, which is the embodiment of the invention where M=2, the reliability information is generated by determining the difference between the correlation sum magnitudes in addition to determining which correlation sum magnitude is larger, which are represented together as the normalized comparison metric C 75. In FIG. 8, the selection bit estimate, with or without additional reliability information, is propagated beyond the biorthogonal demodulator 69 with the plurality of M quantized polarity bit estimates ("P11", "P10", and "P01", and "P00" when M=4) for subsequent symbol deinterleaving and multi-step ECC decoding, described previously.

In the biorthogonal demodulator of FIG. 8 for the general case of M greater than two, the reliability information is optionally determined by computing the difference between the largest correlation sum magnitude and the next largest correlation sum magnitude. In order to make the determined reliability information less sensitive to uncompensated gain change in the received signal amplitude, the reliability metric is optionally normalized by the largest correlation sum magnitude. The selection bit estimate 113 is itself not sensitive to gain variations since it represents the index of the signal in the biorthogonal signal set with the largest crosscorrelation sum magnitude.

If the largest correlation sum magnitude is represented as $|M_i|$, where i is the selection bit estimate, then the reliability information metric, $R_M$ 117 is defined as:

$$R_M = \frac{|M_i| - \max_{\neq |M_i|}\{|M_0|,|M_1|,|M_2|,|M_3|\}}{|M_i|} \tag{9}$$

In the FIG. 8 block diagram, the largest correlation sum magnitude value 119, labeled $|M_i|$ and the next largest correlation sum magnitude value 121, labeled $|M_{i\_}|$, are both determined in the maximum-value function subsystem 115 and propagated to the reliability metric calculator 117. Equation (9) then simplifies to:

$$R_M = \frac{|M_i| - |M_i|}{|M_i|} \tag{10}$$

Since the reliability metric, $R_M$ is a general arithmetic expression requiring an arbitrary number of bits, it is quantized by quantizer 123 to a lessor number of bits in the implementation, typically two to three bits. The use of reliability information (normalized or non-normalized) is optional. If the reliability information is omitted in the FIG. 8 biorthogonal demodulator, the reliability metric calculator 117 and quantizer 123 are omitted, along with signal paths 119, 121, and 125.

The selection bit estimate 113 and the quantized reliability information 125 (if present) are ECC decoded by selection bit ECC decoder 89 and re-encoded by encoder 91 after symbol deinterleaving 71, as in FIG. 7. The reliability information is discarded after ECC decoding and is not part of the re-encoding process. Thus, the re-encoded selection bit estimate has only $\log_2 M$ bits. In the general case, the polarity bit estimate multiplexor 95 in FIG. 7 selects between a plurality of M polarity bit estimates determined in the biorthogonal demodulator of FIG. 8, according to $\log_2 M$ re-encoded selection bits 93. The incorporation of the reliability bit information into the ECC decoding method depends upon the ECC code. For some hard-decision block ECC coding methods (e.g. Reed-Solomon codes), reliability information is typically used to determine whether or not an element in the codeword is to be considered unreliable. In a block code, each codeword consists of a plurality of codeword elements. When reliability information is available, unreliable codeword elements are tagged as being "erasures". Received block codewords which consist of elements whose reliability (i.e. likelihood of an error in contrast to knowledge of a specific error pattern) is known with high degree of confidence have been shown to have much better decoded error performance then received block codewords where the reliability of the elements in the codeword is not known [reference: P. J. Crepeau and K. W. Halford, "Reed-Solomon coding performance with errors and erasures decoding on a Rayleigh fading channel," *Proceedings of MILCOM '94*, pp. 1023–1206, 1994].

The reliability metric $R_M$ given by Equation (10) is in general a non-negative fractional value, limited to between the values of zero (0) and one (1), inclusive by the normalization. The digital arithmetic implementation in the reliability calculator 117 is typically binary-fixed point, preferably, or binary floating point. The normalization in the denominator of Equation (10) may be omitted in order to simplify the implementation, but the metric is then more sensitive to gain-variations. According to Equation (10), the reliability metric $R_M$ is more positive as the difference between the maximum correlation sum magnitude and the remaining correlation sum magnitudes increases. A reliability metric $R_M$ of about zero (0) indicates that there is substantial ambiguity in determining the largest correlation magnitude because the next largest correlation sum magnitude and largest correlation sum magnitude are approximately equal. For block coding with erasures, the optimum threshold in tagging a codeword element as being unreliable is closer the reliability metric value of zero than one. The specific value of the threshold is typically determined by varying the threshold and observing the minimum decoded error rate performance.

For binary convolutional coding, the reliability metric $R_M$ information is typically associated with each of the $\log_2 M$ selection bits. Convolutional code decoding methods such as the Viterbi algorithm typically map the received code sequence (which may have errors and thus not correspond to a valid codeword) to permissible codewords so that the accumulation of a distance metric, measured between the received code sequence and the permissible code words, is a minimum. Typically, the distances are computed using "twos-complement" or "sign-magnitude" implementations of digital arithmetic. For sign-magnitude arithmetic, the selection bit information and reliability information may be simply combined. Each bit in the multiple-bit selection bit estimate 113 is used to represent the sign information (inverted in the FIG. 8 configuration) and the quantized reliability metric 125 represents the magnitude information. However, for twos-complement digital arithmetic, the combination of the reliability metric $R_M$ and the selection bit must be mapped to another multiple-bit binary value, typically implemented with a read-only memory (ROM) look-up table, in order to preserve the proper weighting of the reliability information. This is necessary because of the characteristics of twos-complement arithmetic. An example of the required mapping is shown in Table 1, for the specific embodiment where are two selection bits, each considered separately, and two reliability bits. The two-bit reliability value of "00" represents the least reliable selection bit determination and the value "11" represents the most reliable selection bit determination, having the most differentiation between the largest and next largest correlation sum magnitudes. The result of the mapping is a three-bit twos-complement number since each selection bit is considered independently. The most positive mapped value (twos-complement value "011") corresponds to encoded selection bit value "1", and the most negative mapped value (twos-complement value "100") corresponds to encoded selection bit value "0".

TABLE 1

Selection and reliability bit mapping

| S Bit | $R_M$ Bits | Mapped Bits | Weight |
|---|---|---|---|
| 0 | 00 | 111 | −+ |
| 0 | 01 | 110 | − |
| 0 | 10 | 101 | −− |
| 0 | 11 | 100 | −−− |
| 1 | 00 | 000 | +− |

TABLE 1-continued

Selection and reliability bit mapping

| S Bit | $R_M$ Bits | Mapped Bits | Weight |
|---|---|---|---|
| 1 | 01 | 001 | + |
| 1 | 10 | 010 | ++ |
| 1 | 11 | 011 | +++ |

The receiver system and method of FIGS. 5–8 is applicable in any communication system with a corresponding biorthogonal signal set and biorthogonal transmitter system (not shown), provided that the interleaver, if present, in the transmitter system has a specific internal structure, as described previously, which preserves the association between selection and polarity bits. The receiver system and method do not require the use of a specific ECC method, although the use of convolutional codes makes the implementation of the ECC re-encoder and making use of the additional reliability information straightforward (i.e. in the Viterbi algorithm). Suitable convolutional codes, such as the nonsystematic binary code with input constraint length, K, equal to seven (7) and binary generating polynomials "133" and "171", together with punctured variations thereof for use with EEP or UEP methods, have been described by many authors in the communications literature such as by L. H. C. Lee [reference: L. H. C. Lee, "New rate-compatible punctured convolutional codes for Viterbi decoding," *IEEE Transactions on Communications*, Vol. 42, No. 12, pp. 3073–3079, December 1994] and P. J. Lee [reference: P. J. Lee, "Constructions on rate (n−1)/n punctured convolutional codes with minimum required SNR criterion," *IEEE Transactions on Communications*, Vol. 36, No. 10, pp. 1171–1174, October 1988.

The characteristics of the signals in the biorthogonal signal set are preferable but not required to be spread-spectrum. In general, any signal set which consists of M orthogonal or AO signals is suitable for use with this invention, where M is a binary power of two, and M is greater than or equal to two (2). The receiver system and method may be utilized in wire-line (i.e. not RF) biorthogonal communication system, where there is a physical link between the transmitter and receiver system (e.g. the public switched telephone network, ISDN, coaxial cable, although RF use is preferable). In these embodiments, the advantage brought about by normalizing the comparison metric is relatively unimportant because the signal amplitude is typically very stable. However, there is an advantage in having the additional reliability information for use in soft-decision decoding and the reduction in polarity bit error rate.

Once given the above disclosure, therefore, various other modifications, features or improvements will become apparent to the skilled artisan. Such other features, modifications, and improvements are thus considered a part of this invention, the scope of which is to be determined by the following claims:

I claim:

1. A receiver for receiving and demodulating a biorthogonally modulated signal including a selection bit and a polarity bit, the receiver comprising:

generators for generating signals, each of the generators generating a different signal;

a biorthogonal demodulator for estimating the selection bit from the received signal;

a selection bit decoder for decoding said estimated selection bit in accordance with an error correction code;

a selection bit re-encoder for generating a re-encoded selection bit sequence, using said code, from the decoded selection bit estimates so that polarity bits can be estimated using re-encoded selection bits; and a polarity bit decoder for decoding polarity bit estimates.

2. The receiver of claim 1, further comprising a symbol deinterleaver located between said biorthogonal demodulator and said selection bit decoder.

3. A method of receiving a biorthogonally modulated signal including a selection bit and polarity bit, the method comprising the steps of:

receiving the biorthogonally modulated signal;

estimating the selection bit;

decoding the selection bit estimate according to an error correction code;

re-encoding the decoded selection bit estimate using said code; and estimating the polarity bit of the received biorthogonally modulated signal using the re-encoded selection bit.

4. The method of claim 3 wherein the received signal includes $\log_2 M$ selection bits and one polarity bit in each baud.

5. A receiver for receiving biorthogonally modulated signals including selection bits and polarity bits when M>2, the receiver comprising:

at least four different signal generators and corresponding correlators for determining correlation sums of a received biorthogonally modulated signal when M>2;

a soft-decision combined metric for combining estimated selection bit data having $\log_2 M$ bits, with reliability information including additional bits so as to improve error performance of the receiver; and a decoder for decoding the selection bit data and reliability information forwarded by said combined metric.

* * * * *